United States Patent

Capek

[11] Patent Number: 5,167,304
[45] Date of Patent: Dec. 1, 1992

[54] DRUM BRAKE TORSION/COMPRESSION STRUT SPRING

[75] Inventor: Joseph C. Capek, Granger, Ind.

[73] Assignee: Allied-Signal Inc., Morristown, N.J.

[21] Appl. No.: 776,131

[22] Filed: Oct. 15, 1991

[51] Int. Cl.$^5$ .............................................. F16D 51/22
[52] U.S. Cl. ................................. 188/325; 188/106 A;
 188/106 F; 188/331; 267/155; 267/275
[58] Field of Search .......... 188/106 R, 106 A, 106 F,
 188/325, 196 F; 267/155, 166, 166.1, 180, 275

[56] References Cited

U.S. PATENT DOCUMENTS

| | | | |
|---|---|---|---|
| 1,349,079 | 8/1920 | Markham | 267/155 |
| 1,787,786 | 1/1931 | Jerome | |
| 1,872,872 | 8/1932 | Bendix | |
| 1,987,316 | 1/1935 | Zimmer | 64/29 |
| 2,698,509 | 1/1955 | Valkenburgh et al. | 58/114 |
| 2,741,335 | 4/1956 | Brooks | 188/331 |
| 2,867,842 | 1/1959 | Morton | 16/189 |
| 3,030,783 | 4/1962 | Schmidt | 64/15 |
| 3,235,208 | 2/1966 | Root | 248/27 |
| 3,292,741 | 12/1966 | Dombeck | 188/79 |
| 4,249,646 | 2/1981 | Roberts | 188/328 |
| 4,397,453 | 8/1983 | Seecamp | 267/166.1 |
| 4,828,235 | 5/1989 | Paggeot | 267/155 |
| 4,880,207 | 11/1989 | Matsumoto et al. | 251/337 |

FOREIGN PATENT DOCUMENTS

| | | | |
|---|---|---|---|
| 56617 | 8/1939 | Denmark | 188/106 R |
| 0237158 | 9/1987 | European Pat. Off. | |
| 1362673 | 8/1974 | United Kingdom | |

Primary Examiner—George E. A. Halvosa
Attorney, Agent, or Firm—Larry J. Palguta; Ken C. Decker

[57] ABSTRACT

The torsion/compression strut spring (60) is disposed about a forked end (54) of a parking brake strut (50) in a drum brake (10). The forked end (54) is received loosely about the web (12A) of an associated drum brake shoe (12) and a parking brake lever (40). The web includes a generally U-shaped recess portion (12B) which is sized to seat fixedly one oval-shaped end portion (64) of the spring. The spring (60) has oppositely disposed oval-shaped end portions (62, 64) which, in a disassembled and at-rest position, have longitudinal centerlines located 90° apart relative to one another. When the spring (60) is assembled on the parking brake strut (50), the one end portion (64) seats fixedly within the recess portion (12B) and the other end (62) engages the strut (50) so that the spring (60) exerts a torsional force upon the strut (50) and causes legs (53, 56) of both forked ends (52, 54) of the strut (50) to engage respective sides of the parking brake lever (40) and drum brake shoe web (12A). The spring (60) also biases the strut (50) toward the parking brake lever (40) in order to maintain a rattle free engagement therewith.

4 Claims, 1 Drawing Sheet

DRUM BRAKE TORSION/COMPRESSION STRUT SPRING

The present invention relates generally to a torsion/compression strut spring for a drum brake, and in particular to a torsion/compression spring for a strut connected with a parking brake lever and drum brake shoe of a drum brake.

Drum brakes typically include a parking brake lever which, when rotated by a cable attached to either a foot pedal or hand lever in the passenger compartment, displaces laterally within the drum brake a strut that engages one of the drum brake shoes. By reaction, the other drum brake shoe, to which the lever is pivotally connected, expands outwardly to engage the drum. The parking brake strut may include a pair of forked ends, with the legs of the forks received loosely about both sides of the shoe web at one end and the parking brake lever at the other end. Typically, a compression spring is mounted about the forked end which engages the associated drum brake shoe web, and a slotted washer is also located over the forked end so that the strut is biased into engagement with the parking brake lever and the washer provides a seat for the compression spring while also limiting rotational movement of the strut relative to the web as a result of the associated fork being received within the slot-shaped opening of the washer. Such a construction has not always proven to be noise and rattle free. It is highly desirable to provide a parking brake strut and spring assembly which will utilize a minimum number of parts, while effectively eliminating any rattling or noise that might be generated by the strut moving relative to the drum brake shoe web and/or parking brake lever.

The present invention provides solutions to the above problems by providing a drum brake having a lever and a strut extending between said lever and a drum brake shoe of the drum brake, the strut having an end slidably received by a web of said drum brake shoe, and a spring located about said end of the strut and biasing the strut away from the web of the drum brake shoe, the improvement wherein the spring comprises a torsion and compression coil spring having opposite oval-shaped end portions, the end portions located with some clearance about the end of the strut, one end portion located nearest a free end of the strut being received within the web such that the one end portion is fixedly positioned by the web of the drum brake shoe so that the spring exerts a torsional force upon the strut relative to the drum brake shoe and biases the strut laterally toward the lever.

One way of carrying out the invention is described in detail below with reference to the drawings which illustrate an embodiment in which.

Figure 1:
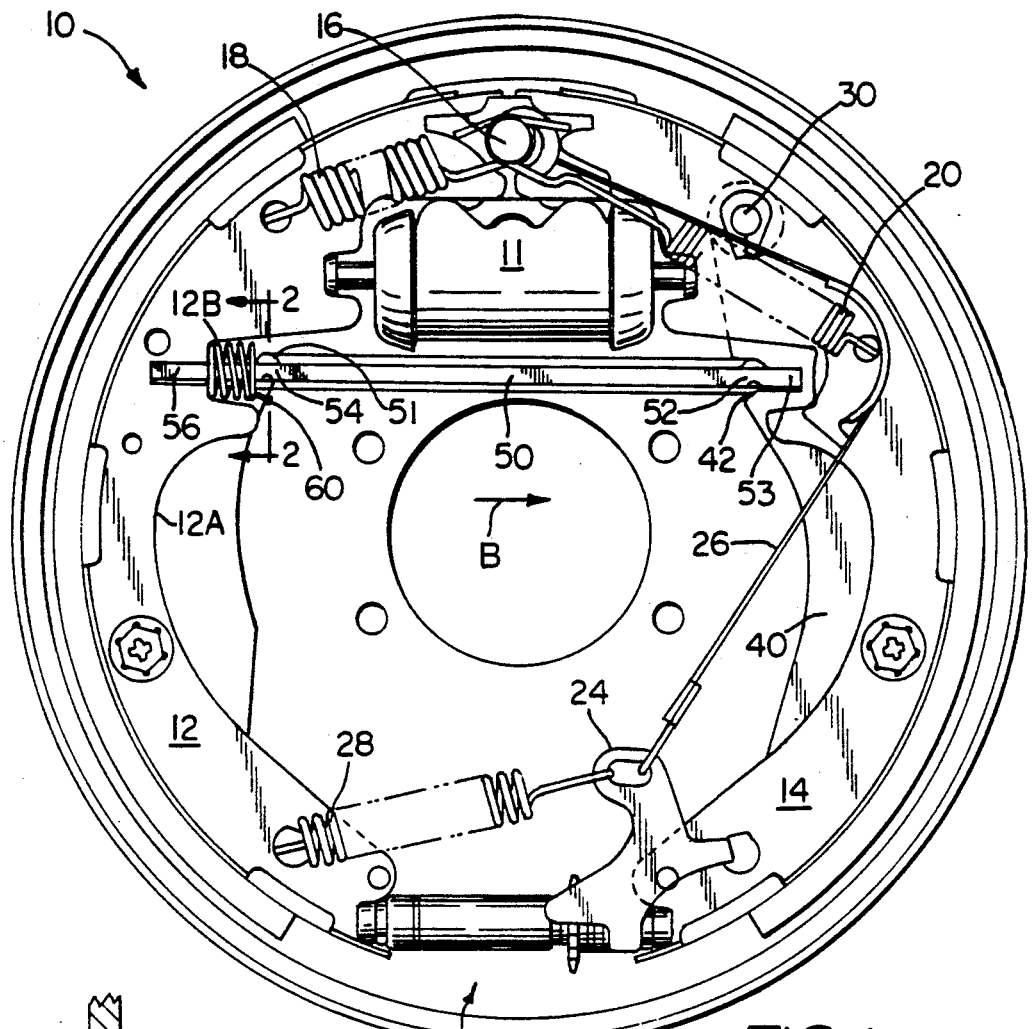
FIG. 1 is a side view of a drum brake including the present invention.
Figure 2:
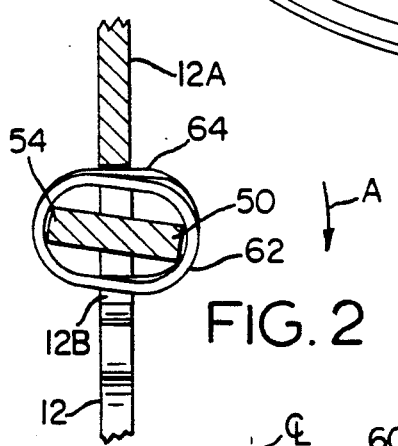
FIG. 2 is a view taken along view lines 2—2 of FIG. 1.
Figure 4:
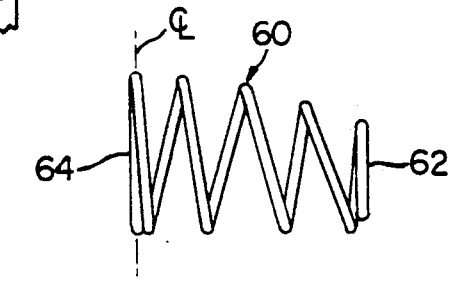
FIG. 4 is a view taken along view line 4—4 of FIG. 3.
Figure 3:
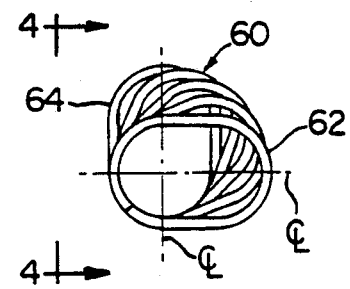
FIG. 3 is an end view of the torsion/compression strut spring of the present invention when in a disassembled, at rest position.

FIG. 1 is an illustration of a drum brake designated generally by reference numeral 10 and having therein the present invention. Drum brake 10 includes wheel cylinder 11 which biases apart drum brake shoes 12 and 14. The upper ends of drum brake shoes 12 and 14 are biased into engagement with anchor 16 by return springs 18 and 20. The lower ends of drum brake shoes 12 and 14 engage a typical star wheel lining wear adjuster device 22 which is actuated by pawl 24 connected with cable 26 and spring 28. Drum brake shoe 14 includes pivotal connection 30 for parking brake lever 40 which is actuated by a not shown parking brake cable. Parking brake lever 40 includes recessed portion 42 receiving loosely therein forked end 52 and forked legs 53 (only one shown) of parking brake strut 50. Parking brake strut 50 includes an oppositely located forked end 54 comprising two legs 56 (only one shown) received normally loosely about web 12A of drum brake shoe 12. Web 12A includes a generally U-shaped recessed portion 12B which is sized to provide a seat for torsion/compression spring 60 of the present invention. Torsion/compression coil spring 60 includes oppositely disposed oval ends 62 and 64. As illustrated in FIGS. 3 and 4, oval shaped end 62 includes a longitudinal centerline which is located at a 90° angle relative to the centerline of oval-shaped end 64. Spring 60 is manufactured such that when the spring is mounted upon forked end 54, the spring will have a predetermined amount of looseness or play about the fork so that the oval-shaped ends, when one oval-shaped end is anchored, will exert a torsional or rotational force upon strut 50. FIG. 2 illustrates oval-shaped end 62 located about forked end 54 such that a torsional force in the direction of Arrow A is exerted upon forked end 54 of strut 50. As illustrated in FIG. 1, oval-shaped end 64 is captured and anchored within the U-shaped recess portion 12B such that the spring, which is positioned with some play about strut 50, exerts a torsional force via oval-shaped end 62 upon strut 50. This causes legs 53 and 56 (only the front legs shown) of forked ends 52 and 54, which are received loosely about lever 40 and web 12A, to engage respective sides of lever 40 and web 12A and eliminate any rattling movement therebetween. Additionally, torsion/compression strut spring 60 exerts a biasing force in the direction of Arrow B (FIG. 1) upon strut 50 in order to bias the strut into engagement with parking brake lever 40 at forked end 52, and thereby eliminating rattling movement therebetween. End 62 engages enlarged portion 51 of strut 50 to exert the lateral biasing force upon the strut.

The torsion/compression strut spring of the present invention effectively eliminates the washer with slotted opening utilized in previous assemblies, and effects the dual function of biasing laterally the parking brake strut into engagement with the parking brake lever and biasing torsionally the parking brake strut so that the legs of the respective forked ends engage the respective sides of the drum brake shoe web and parking brake lever.

The torsion/compression strut spring of the present invention has proven to be an effective mechanism for positioning the strut relative to the parking brake lever and drum brake shoe web, while effectively eliminating noise generating movements between the strut, shoe web, and parking brake lever.

I claim:

1. In a drum brake having a lever and a strut extending between said lever and a drum brake shoe of the drum brake, the strut having an end slidably received by a web of said drum brake shoe, and a spring located about said end of the strut and biasing the strut away from the web of the drum brake shoe, the improvement wherein the spring comprises a torsion and compression coil spring having opposite oval-shaped end portions exerting a torsional force relative to one another, the end portions located with some clearance about the end of the strut, one end portion located nearest a free end of the strut being received within the web such that the one end portion is fixedly positioned by the web of the drum brake shoe and the other end portion engaging an enlarged portion of the strut so that the spring exerts a torsional force upon the strut relative to the drum brake shoe and biases the strut laterally toward the lever.

2. The drum brake in accordance with claim 1, wherein the spring, when disassembled from said strut, has longitudinal centerlines of the end portions located 90° apart relative to one another in a rest position of the spring, and when assembled with the strut the spring biases diagonally opposite corners of the strut.

3. The drum brake in accordance with claim 1, wherein the strut has a forked end receiving therein the web of the drum brake shoe, the spring causing the strut to rotate relative to a longitudinal centerline of the strut so that each leg of the fork engages a respective side of the web.

4. The drum brake in accordance with claim 3, wherein the web comprises a generally U-shaped recess portion which captures said one end portion in order to anchor the one end portion relative to the brake shoe and permit the spring to effect a torsional force upon the lever.

* * * * *